US006085557A

United States Patent [19]

Kaye, Jr.

[11] Patent Number: 6,085,557

[45] Date of Patent: Jul. 11, 2000

[54] ANTI-THEFT DEVICE FOR MARINE PROPELLERS

[76] Inventor: Kenneth B. Kaye, Jr., Stop-Lock, Inc,. 10360 72nd St. North, Suite 803, Largo, Fla. 33777

[21] Appl. No.: 09/361,149

[22] Filed: Jul. 27, 1999

Related U.S. Application Data

[60] Provisional application No. 60/095,844, Aug. 7, 1998.

[51] Int. Cl.[7] ........ F16B 41/00

[52] U.S. Cl. ........ 70/14; 70/232; 416/245 A

[58] Field of Search ........ 70/14, 232, 258, 70/DIG. 57; 416/146 B, 244 B, 245 A, 247 A, 247 R

[56] References Cited

U.S. PATENT DOCUMENTS

| | | | |
|---|---|---|---|
| D. 271,583 | 11/1983 | Badzinski et al. | D12/16 |
| D. 298,911 | 12/1988 | Burke, Sr. | D8/330 |
| 3,004,421 | 10/1961 | Bowler | 70/14 |
| 3,486,351 | 12/1969 | Banham | 70/232 X |
| 3,631,896 | 1/1972 | Meigs | 70/232 X |
| 3,732,033 | 5/1973 | Macchi | 416/244 |
| 3,759,076 | 9/1973 | Reese | 70/232 |
| 3,981,165 | 9/1976 | Wersinger | 70/232 |
| 3,981,617 | 9/1976 | Milewicz | 416/244 B |
| 4,008,585 | 2/1977 | Lundberg | 70/164 |
| 4,257,247 | 3/1981 | Sims | 70/232 |
| 4,389,199 | 6/1983 | Badzinski et al. | 440/74 |
| 4,538,962 | 9/1985 | McCain | 70/146 R |
| 4,645,422 | 2/1987 | Brushaber | 416/93 A |
| 4,715,783 | 12/1987 | Wade | 416/146 R |
| 5,135,358 | 8/1992 | Myers | 416/245 A |
| 5,246,345 | 9/1993 | Adams, Jr. | 416/247 A |
| 5,417,093 | 5/1995 | Heiberg | 70/232 |
| 5,437,171 | 8/1995 | Owen | 70/14 |
| 5,469,721 | 11/1995 | Pyle | 70/14 |
| 5,613,386 | 3/1997 | Mire, Sr. | 70/232 |
| 5,791,955 | 8/1998 | Rinck | 416/247 A X |

FOREIGN PATENT DOCUMENTS

| | | | |
|---|---|---|---|
| 1028166 | 3/1978 | Canada | 70/232 |
| 0 002 424 A1 | 6/1979 | European Pat. Off. . | |
| 2 160 282 A | 12/1985 | United Kingdom . | |

*Primary Examiner*—Lloyd A. Gall
*Attorney, Agent, or Firm*—Richard C. Litman

[57] ABSTRACT

An anti-theft device, for preventing unauthorized access to the propeller retaining nut, includes two sections that fit together to form an access-preventing cap. The cap fits around an expanded rim normally found on propeller center-bodies, and the cap cannot be pulled off the propeller center-body without disengaging the two sections from one another. A tongue extending from one section is engaged by a grooved dowel going through the base portion of the second section to hold the two sections together. A key operated locking flap engages the groove in the dowel to prevent removal of the dowel without possession of the appropriate key. In a second embodiment, an adapter is placed on the propeller shaft, between the propeller and the propeller retaining nut. The access-preventing cap is of smaller dimensions than in the first embodiment and is shaped to engage the adapter.

7 Claims, 7 Drawing Sheets

ANTI-THEFT DEVICE FOR MARINE PROPELLERS

CROSS-REFERENCE TO RELATED APPLICATION

This application claims the benefit of U.S. Provisional Patent Application Ser. No. 60/095,844, filed Aug. 7, 1998.

BACKGROUND OF THE INVENTION

1. Field of the Invention

The present invention relates to a device for preventing unauthorized access to the hub of the propellers of boats or the like, in order to prevent unauthorized persons from removing the propeller from the boat's propulsion system.

2. Introduction and Description of Related Art

When motor boats or other watercraft are removed from the water and placed on a trailer and the trailer is left unattended, in a parking lot for example, the propellers of such water craft are vulnerable to theft. The thief simply has to remove the propeller retaining nut and then slide the propeller of the propeller shaft and the thief can make off with the propeller. Such boat propellers are costly to replace. Further, the delay due to the procurement of a replacement propeller, or the unavailability of a replacement propeller in certain areas, can spoil a carefully planned vacation, excursion, or fishing trip, at great financial cost to the boat user.

For these reasons, a myriad of anti-theft devices for marine propellers, or propeller locks as they are commonly known, have been proposed in the prior art.

For example, U.S. Pat. No. 5,613,386, issued to Jerry D. Mire, Sr. on Mar. 25, 1997, and U.S. Pat. No. 4,257,247, issued to Gary F. Sims on Mar. 24, 1981, disclose propeller locks having a cap portion that blocks access to the propeller retaining nut. The caps are held in place by arms that extend behind the propeller blades. Relative movement between the cap and the propeller is prevented by a cuff and padlock or a chain and padlock arrangement that engages the arms behind the propeller blades.

U.S. Pat. No. 5,417,093, issued to Martin D. Heiberg on May 23, 1995, discloses a propeller lock having a clamshell arrangement that fits around the concavely flared end of the propeller center-body to deny access to the propeller retaining nut. U.S. Pat. No. 5,246,345, issued to Michael J. Adams on Sep. 21, 1993, discloses a propeller lock having a clamshell arrangement that encloses the entire propeller to deny access to the propeller retaining nut. Both the Heiberg and the Adams devices use padlocks to prevent the unauthorized removal of the devices.

U.S. Pat. No. 4,645,422, issued to Donald Brushaber on Feb. 24, 1987, and U.S. Pat. No. 4,538,962, issued to Conrad L. McCain on Sep. 3, 1985, disclose propeller locks in the form of cone-shaped covers that prevent access to the propeller retaining nut. Both these devices require the replacement of the standard propeller retaining nut with a specialized propeller retaining nut. Both these devices use specialized tools keyed to matching patterns in the head of a bolt to prevent unauthorized removal of the cone-shaped cover.

U.S. Pat. No. 5,135,358, issued to James R. Myers on Aug. 4, 1992, discloses a cone-shaped cover that encloses the propeller retaining nut. The cone-shaped cover of Myers is retained in place by a plurality of resilient catches. The device of Myers is intended to render access to the propeller retaining nut more difficult, but this device cannot entirely prevent access to the propeller retaining nut.

U.S. Pat. No. 3,981,165, issued to Merol O. Wersinger on Sep. 21, 1976, discloses a propeller lock which fit around the inner propeller hub located within the center-body of the propeller and envelops the propeller retaining nut. The lock of Wersinger has two halves that fit together to form a jacket around the inner propeller hub. In the typical propeller the inner propeller hub is spaced from the interior surface of the propeller center-body creating an annular passage. The inner propeller hub is supported coaxially within the propeller center-body by a plurality of fins. One of the halves has a relief cut that allows a portion of that half to fit behind one of the fins. When the two halves are locked together, the device cannot be rotated such that the relief cut clears the fin. Thus, the device cannot be pulled off the propeller inner hub when the two halves are locked together. The two halves of the Wersinger device are locked together by a padlock.

U.S. Pat. No. 3,759,076, issued to John B. Reese on Sep. 18, 1973, discloses a propeller lock including a cup slidably mounted to a bar having a hooked end. The hook at the end of the bar is placed behind one of the fins supporting the propeller inner hub and the cup is slid into position covering the propeller retaining nut. A key operated, sliding lock is then moved into abutting contact with the cup and locked in place, thus capturing the cup between the propeller inner hub and the sliding lock.

U.S. Pat. No. 3,732,033, issued to Joseph E. Macchi on May 8, 1973, discloses a propeller lock including an adapter which mounts to the propeller shaft between the propeller and the propeller retaining nut. A cap fits the adapter and fully encloses the propeller retaining nut. The cap is secured to the adapter by a key-operated, cylinder lock. The cap fits a groove in the rim of the adapter, leaving the sides of the adapter exposed. The exposed adapter allows large pliers to be used to turn the adapter. There may be sufficient friction between the adapter and the propeller retaining nut to allow the propeller retaining nut to be turned as the adapter is turned, thus defeating the purpose of the lock.

U.S. Pat. No. 3,981,617, issued to Norbert W. Milewicz on Sep. 21, 1976, discloses a propeller lock for use with propellers having retaining nuts prevented from turning by a cotter pin. The standard propeller retaining nut is replaced by an elongated retaining nut having slots for the cotter pin. The end of the elongated nut projecting beyond the end of the propeller shaft, is configured for engagement by the tumblers of a cylinder lock. A retaining nut cover is placed over the elongated retaining nut and the retaining nut cover is held in place by a cylinder lock engaging the elongated retaining nut, thus preventing unauthorized access to the elongated retaining nut.

U.S. Pat. No. 4,715,783, issued to Mark W. Wade on Dec. 29, 1987, discloses an anti-theft device for marine propellers having two bars linked by a chain. The chain goes around the portion of the motor housing containing the bearings for the propeller shaft, positioning the two bars just above the propeller hub. A propeller blocking cylinder fits over the propeller hub and is locked to the bars to prevent unauthorized removal of the propeller. The Wade device can be easily defeated by the use of bolt cutters.

U.S. Pat. No. 5,469,721, issued to Stephen K. Pyle on Nov. 28, 1995, discloses an anti-theft device for marine propellers including a rigid case that completely surrounds the propeller and the lower portion of the motor housing. The case is locked with a padlock, making the device vulnerable to defeat by bolt cutters.

Canadian Patent Number 1,028,166, issued to Richard C. Slatford on Mar. 21, 1978, discloses a propeller lock having a washer that fits on the propeller shaft behind the propeller retaining nut. A split cup covers the retaining nut and engages the washer. The halves of the split cup are held together by a lock body that receives a pair of studs projecting from each half of the split cup.

None of the above described inventions employs a tongue having a through hole that is engaged by a grooved dowel to lock two halves of a protective cover together. None of the above inventions and patents, taken either singly or in combination, is seen to describe the instant invention as claimed.

SUMMARY OF THE INVENTION

The present invention is an anti-theft device which prevents unauthorized access to the propeller retaining nut, thus preventing theft of the propeller. The anti-theft device includes two sections that fit together to fully enclose the tail end of the propeller center-body by forming a access-preventive cap around the tail end of the propeller center-body. The interior of the cap formed by the two sections has a portion that is larger in diameter than the front opening of the cap. The larger diameter portion accommodates an expanded rim normally found on propeller center-bodies, while the front opening of the cup is smaller in diameter than the expanded rim of the propeller center-body. Thus, the cap formed by the two sections cannot be pulled off the propeller center-body without disengaging the two sections of the anti-theft device from one another. One section of the anti-theft device has a tongue that fits into a cavity in the second section of the anti-theft device. A removable dowel goes through the walls of the cavity and the tongue to hold the two sections of the anti-theft device together. A key operated locking flap engages a groove in the dowel to prevent removal of the dowel without the appropriate key, and thus prevents unauthorized removal of the anti-theft device from the propeller.

In a second embodiment, an adapter is placed on the propeller shaft, between the propeller and the propeller retaining nut. The adapter has flanges on its outer surface that engage matching grooves on the interior surface of a access-preventing cap similar to the access-preventing cap of the first embodiment described above. The access-preventing cap of the second embodiment is generally of smaller dimensions than that of the first embodiment. As before, the cup is in two sections and can only be removed from the adapter by separating the two sections. As with the first embodiment, the two sections are held together by a grooved dowel passing through a hole in the base portion of one section and a hole in a tongue extending from the other section. A key operated locking flap selectively engages or is disengaged from the groove in the dowel to allow the removal of the dowel only by a possessor of the appropriate key.

Accordingly, it is a principal object of the invention to provide an anti-theft device for preventing the removal of marine propellers from the propulsion systems of watercraft by unauthorized persons.

It is another object of the invention to provide an anti-theft device for marine propellers that is highly resistant to tampering.

It is a further object of the invention to provide an anti-theft device for marine propellers that can fit more than one type of propeller.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
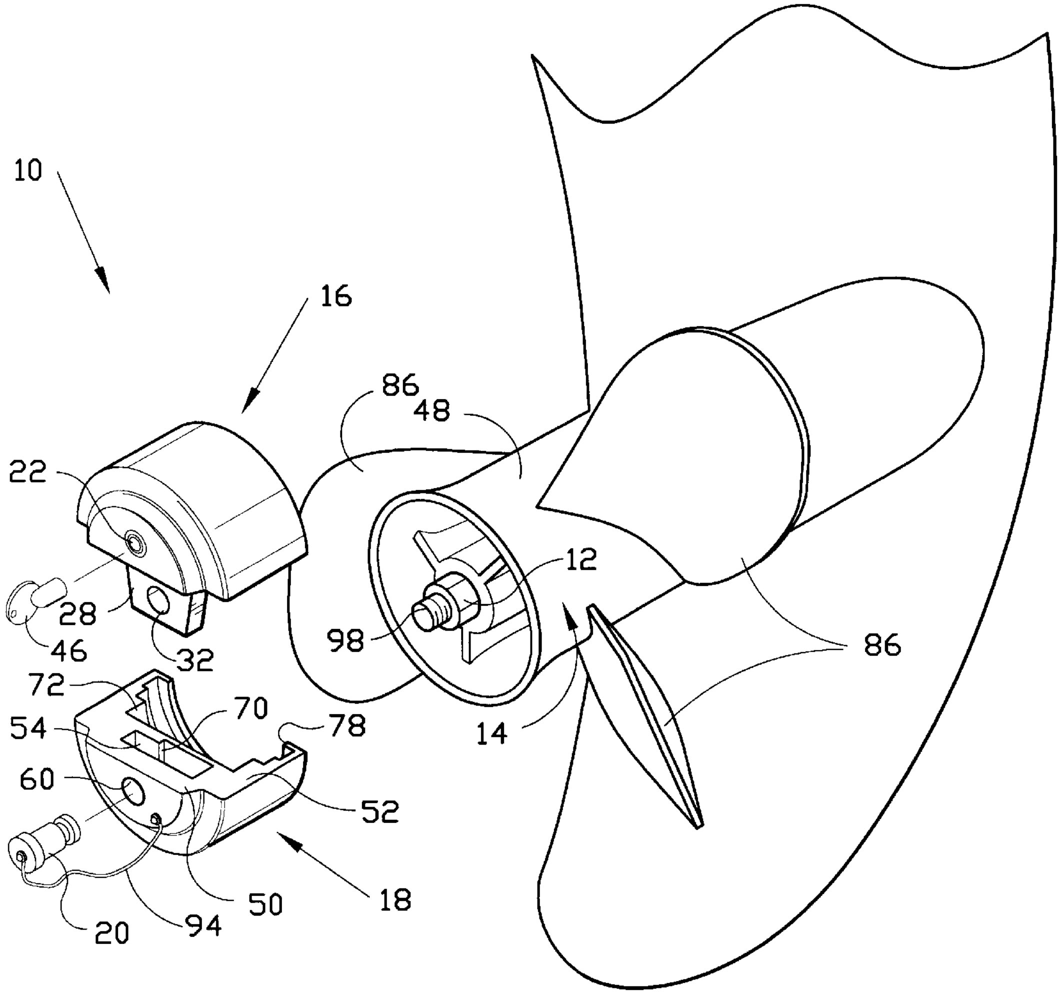
FIG. 1 is an environmental exploded view showing the functional units of the anti-theft device of the present invention in relation to a marine propeller.
Figure 2:
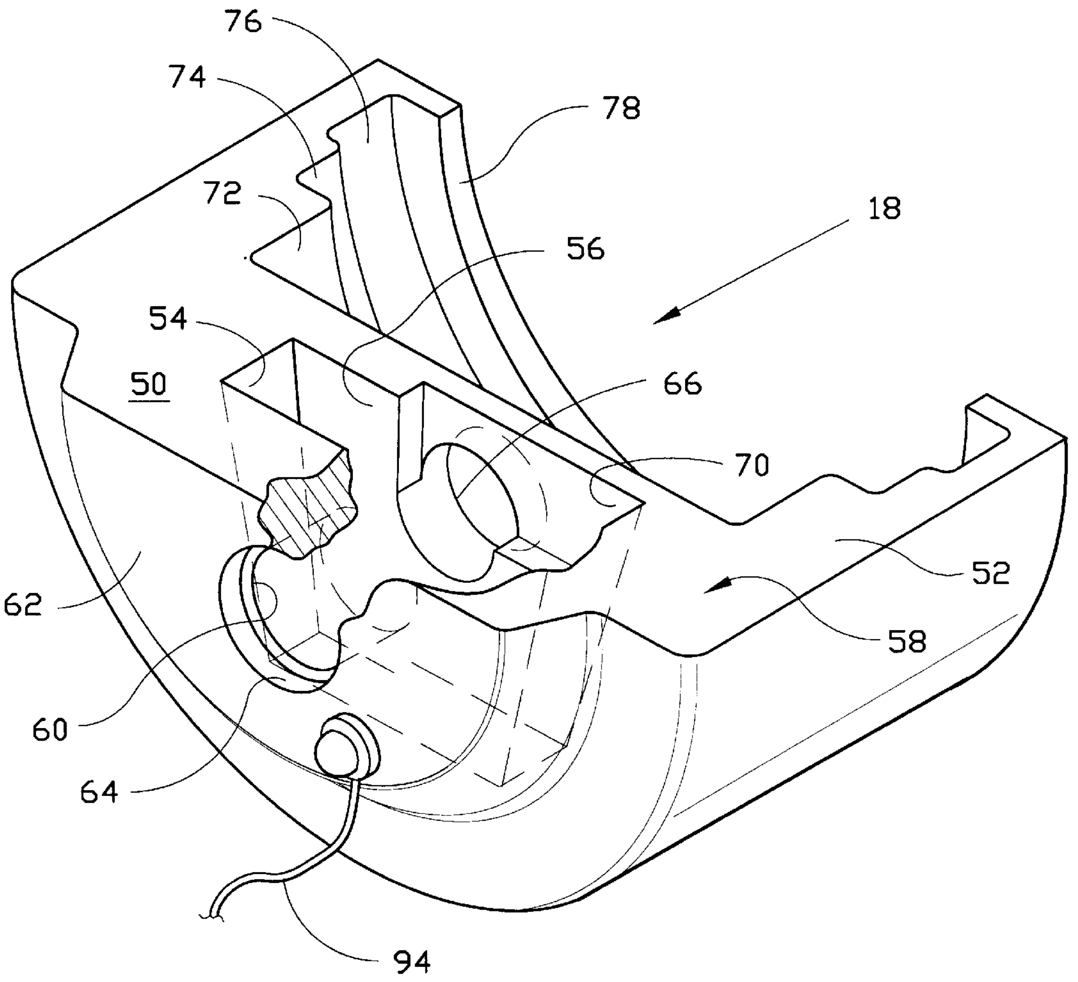
FIG. 2 is a partially cutaway perspective view of the second section of the anti-theft device of the present invention showing the cavity for receiving the tongue of the second section of the anti-theft device.
Figure 3:
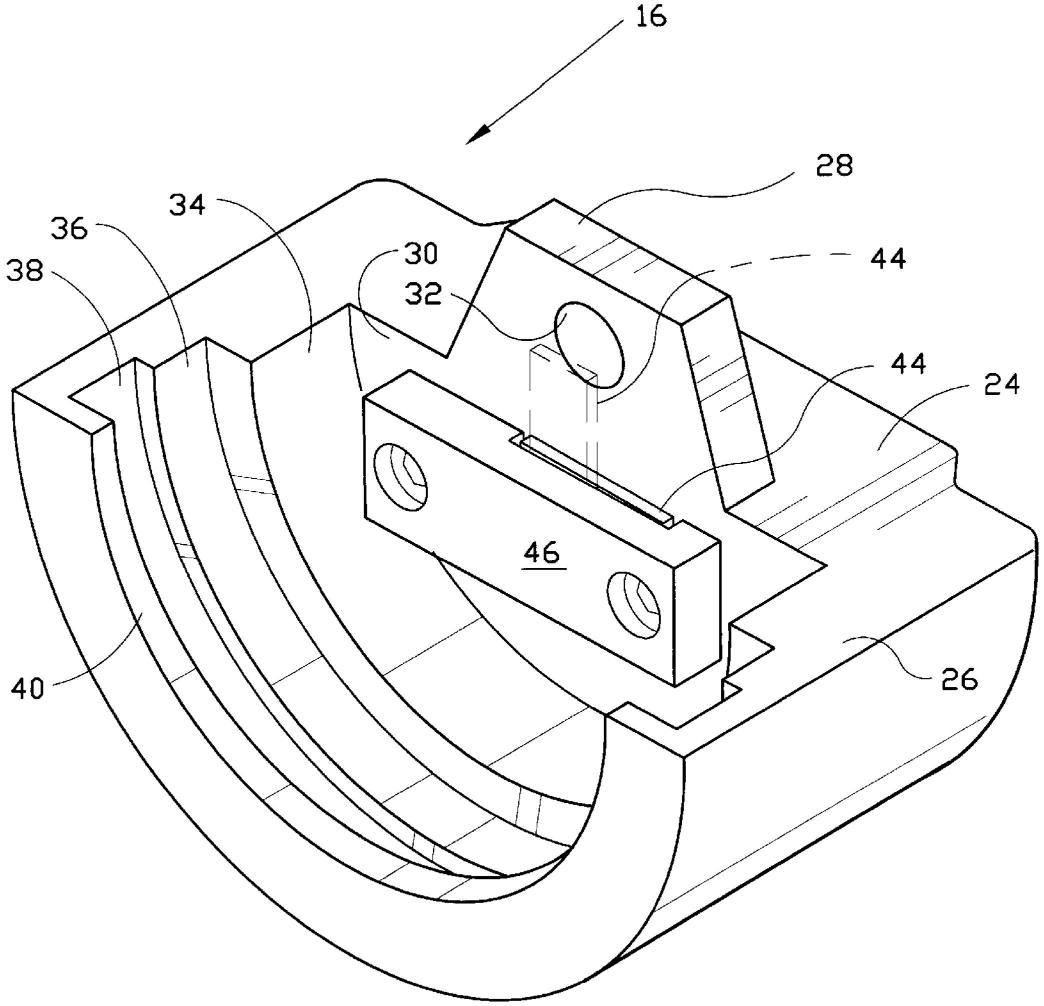
FIG. 3 is a perspective view of the first section of the anti-theft device of the present invention showing the locked and unlocked positions of the locking flap attached to the cylinder lock, and the tongue which interlocks with the cavity in the first section of the anti-theft device.
Figure 4:
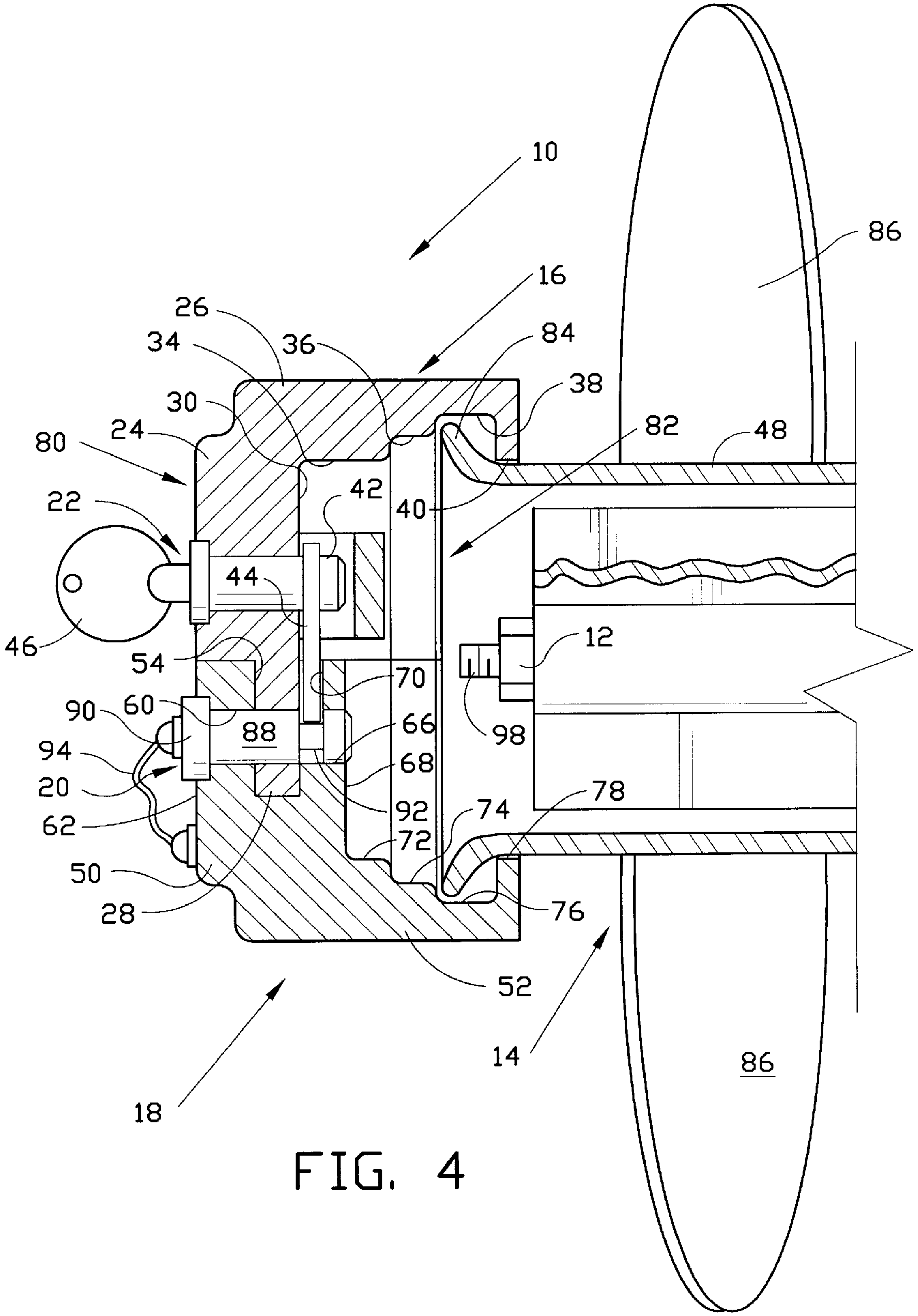
FIG. 4 is a cross sectional, environmental view of the anti-theft device of the present invention showing the retaining dowel passing through the tongue and cavity walls to lock the two sections of the anti-theft device together.
Figure 5:
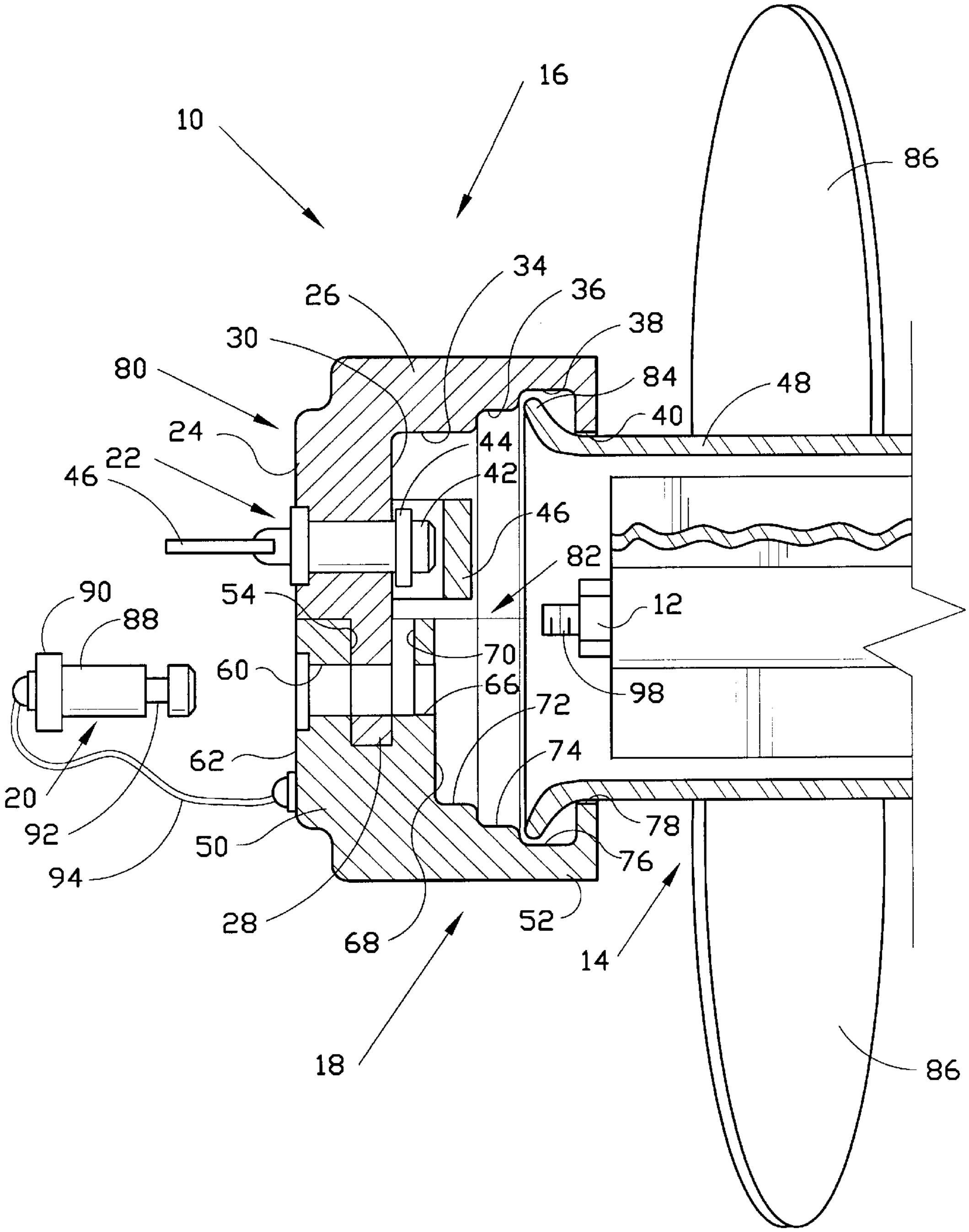
FIG. 5 is a cross sectional, environmental view of the anti-theft device of the present invention showing the retaining dowel removed from the two sections of the anti-theft device.

Referring to FIGS. 1–5, the present invention is an anti-theft device 10 which prevents unauthorized access to the propeller retaining nut 12, thus preventing theft of the propeller 14. The anti-theft device 10 includes a first section 16, a second section 18, a dowel 20, and a cylinder lock 22. Referring to FIGS. 3–5, the first section 16 has a first base portion 24 and a first wall portion 26. The first base portion 24 has a tongue 28 extending therefrom, the tongue 28 extending in a plane parallel to the inner surface 30 of the first base portion 24. The tongue 28 has a first through hole 32. The inner surface 34 of the first wall portion 26 has two large diameter portions 36 and 38; the function of these large diameter portions will be explained later. The first wall portion 26 terminates in a first rim portion 40, at its end distal from the first base portion 24.

The cylinder lock 22 is incorporated into the first base portion 24. The cylinder lock 22 is conventional in design and will not be described in detail herein. The cylinder lock 22 includes lock cylinder 42. A locking flap 44 is fixedly attached to the lock cylinder 42 such that the two rotate as a unit about the longitudinal axis of the lock cylinder 42. With the key 46 placed in the lock 22, the lock cylinder 42 can be rotated which in turn rotates the locking flap 44 between a locked position (shown in dashed lines in FIG. 3) and an unlocked position. An optional protective guard 46 is fastened to the inner surface 30 to protect the locking flap 44 and lock cylinder 42 from the occasional impact with the propeller hub 48 as the anti-theft device 10 is mounted to or removed from the propeller hub 48. As can be seen in FIG. 3, when the locking flap 44 is in the unlocked position, the locking flap is fully retracted behind the protective guard 46, while the locking flap 44 projects from the protective guard 46 and overlaps a portion of the hole 32 as viewed through the hole 32 when the locking flap 44 is in the locked position. In the illustrated example, the protective guard is fastened to the inner surface of the first base portion by allen-head screws, although any well known means of fastening or fixing including welding, brazing, soldering, or machining from the same piece as the first base portion may be used.

Referring to FIGS. 2, 4, and 5, the second section 18 has a second base portion 50 and a second wall portion 52. The second base portion 50 has a second cavity 54 extending into the base portion 50. Referring to FIG. 2, the cavity 54 has an opening 56 at the interfacial surface 58 where the section 18 abuttingly contacts section 16. A second through hole 60 extends between the cavity 54 and the external surface 62 of the second base portion 50. The hole 60 has a counter-sunk portion 64 the function of which will be explained later. A third through hole 66 extends between the cavity 54 and the inner surface 68 of the second base portion 50. The cavity 54 also has a clearance cut 70 to allow the locking flap 44 to move into the cavity 54 unobstructed when the locking flap 44 is moved to the locked position while the sections 16 and 18 are assembled together as one unit. The inner surface 72 of the second wall portion 52 has two large diameter portions 74 and 76 which respectively match the two large diameter portions 36 and 38 in diameter. The function of these large diameter portions is explained below. The second wall portion 52 terminates in a second rim portion 78, at its end distal from the second base portion 50.

The first section 16 and the second section 18 fit together to form an access-preventing cap 80 having a base portion, formed by base portions 24 and 50, and a surrounding wall formed by wall portions 26 and 52. The surrounding wall of the access-preventing cap 80 extends from the base portion of the access-preventing cap 80 and terminates in a rim portion formed by rim portions 40 and 78. The rim portion formed by rim portions 40 and 78 is located distally from the base portion of the access-preventing cap 80. The base portion and the surrounding wall of the access-preventing cap 80 define a first cavity 82 sized to house a diffuser portion 84 of a marine propeller hub 48.

The rim portions 40 and 78 define the front opening of the cavity 82. The front opening of the cavity 82 is circular and has a first diameter which is large enough to fully encircle the portion of the propeller hub 48 between the diffuser 84 and the propeller blades 86.

The diffuser portion 84 is formed at least in part by an expanded portion being larger in diameter than the diameter of the front opening of the cavity 82, such that when the diffuser portion 84 of the marine propeller hub 48 is housed within the cavity 82, the access-preventing cap 80 cannot be pulled off the marine propeller hub 48 without separating the first and second sections 16 and 18 from one another.

Figure 6:
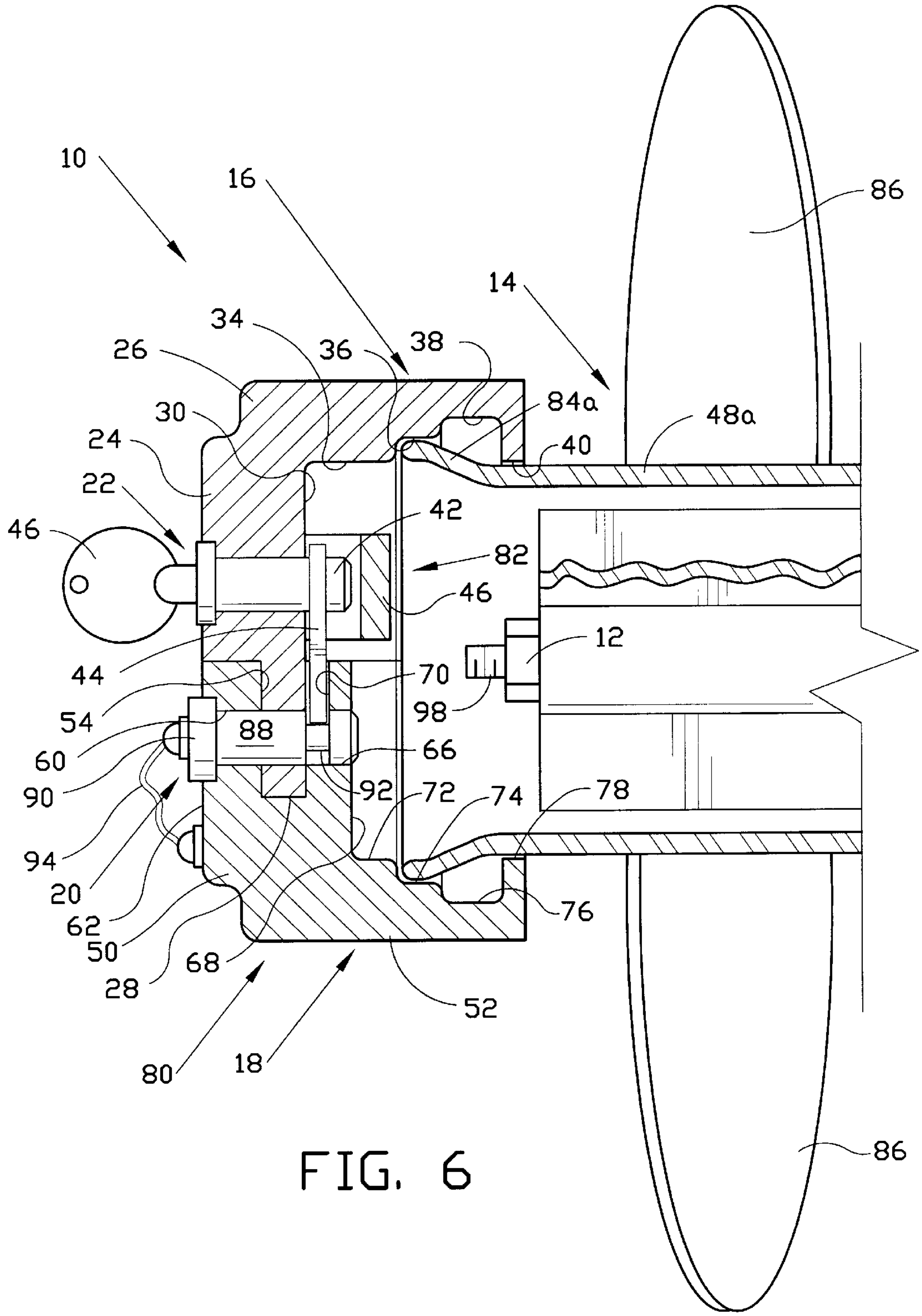
FIG. 6 is a cross sectional environmental view of the anti-theft device of the present invention showing the anti-theft device of the present invention applied to a propeller having a diffuser of the convex type.

The diffuser 84, illustrated in FIGS. 1, 4, and 5, is of the flared type that flares out concavely to a larger diameter. The large diameter portion of the cavity 82 formed by large diameter portions 76 and 38 is sized to accommodate the flared type diffuser 84. Referring to FIG. 6, the large diameter portion of the cavity 82 formed by large diameter portions 74 and 36 is sized to accommodate a diffuser 84*a* which is of a type that expands convexly from the smaller diameter portion of a propeller hub 48*a*. Thus, the device 10 can fit a variety of propeller hub types.

When the first section 16 and the second section 18 are fitted together to form the access-preventing cap 80, the cavity 54 receives the tongue 28 such that the holes 60, 32, and 66 are all in registry with one another. The dowel 20 can be inserted through the holes 60, 32, and 66 so as to extend through these holes in order to prevent the first section 16 from being separated from the second section 18 when the device 10 is applied to safeguard a propeller 14.

The dowel 20 is in the form of a cylindrical shaft 88 having a flange 90 at one end and a groove 92 proximate the other end. The flange 90 abuts the countersunk portion 64 to prevent the dowel 20 from being inserted too far into the hole 60. The position of the groove 92 relative to the flange 90 is selected such that the groove 92 is in registry with the locking flap 44 when the dowel 20 is fully inserted into the hole 60 after the first section 16 and the second section 18 are fitted together to form the access-preventing cap 80.

The key 46 can then be used to bring the locking flap 44 into engagement with the groove 92 to prevent the dowel 20 from being removed from the access-preventing cap 80. Thus the cylinder lock 22 functions to selectively lock the sections 16 and 18 together. With the sections 16 and 18 clamped around the diffuser portion of a propeller, the dowel 20 inserted into holes 60, 32, and 66, and the locking flap 44 engaged to the groove 92, the anti-theft device 10 effectively prevents access to the propeller retaining nut 12 unless the person seeking access to the nut 12 possesses the key 46. Thus device 10 prevents unauthorized access to the propeller retaining nut 12. A tether 94 is preferably used to connect the dowel 20 to the section 18 to prevent inadvertent loss of the dowel 20.

The first section 16 and the second section 18 can be made of any suitably strong material such as steel, aluminum and its alloys, high strength plastics, and composite materials. The dowel 20 can be made of similar materials, with aluminum and steel being preferred. The cylinder lock 22 can be obtained as an off-the-shelf item and is usually of steel construction, although the use of any type of lock that selectively prevents removal of the dowel 20 is contemplated as being within the scope of the present invention.

Figure 7:
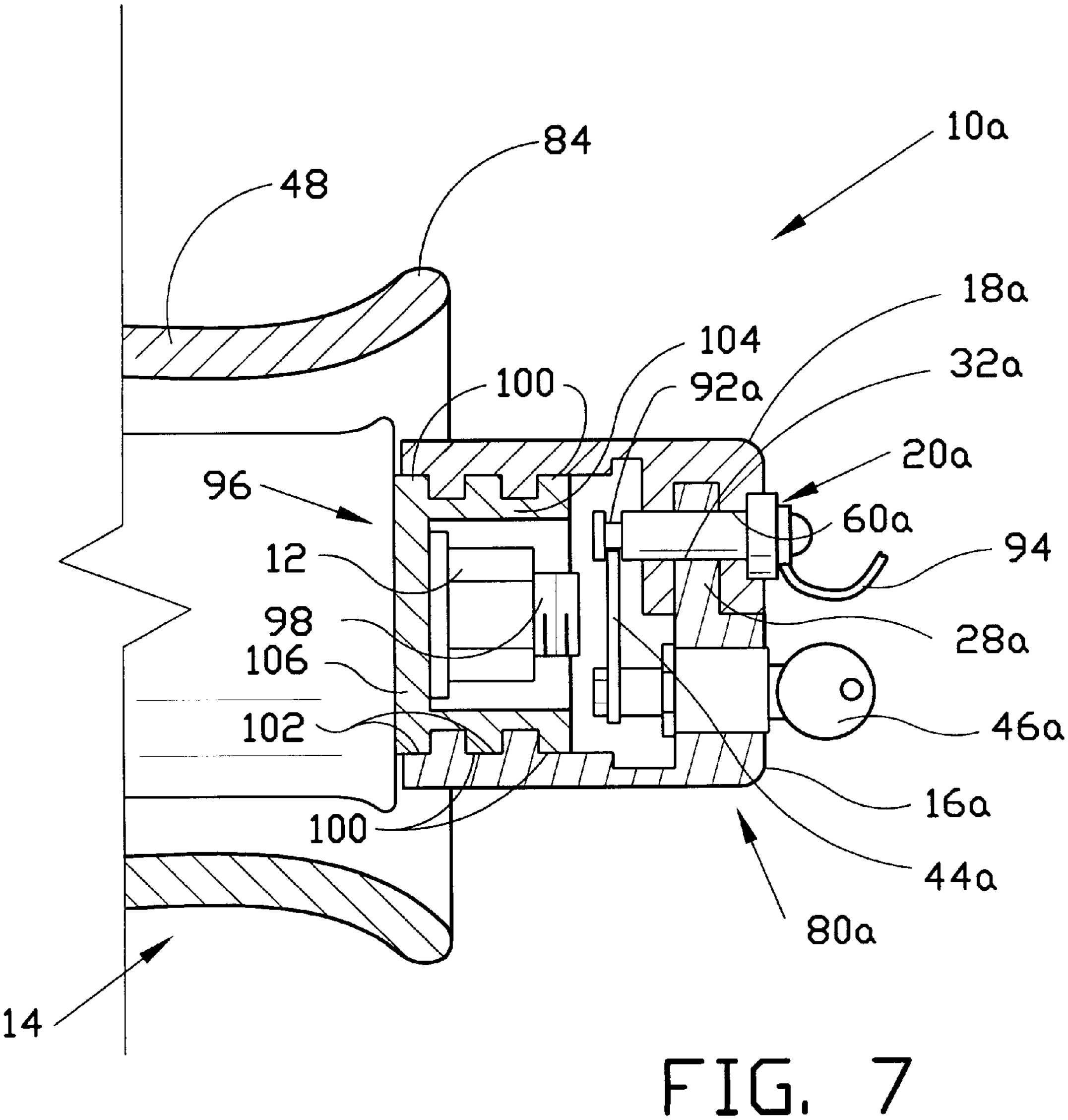
FIG. 7 is a cross sectional, environmental view of a second embodiment of the present invention designed to fit around the propeller retaining nut.

In a second embodiment 10*a*, an adapter 96 is placed on the propeller shaft 98, between the propeller 14 and the propeller retaining nut 12. The adapter 96 has flanges 100 on its outer surface that engage matching grooves 102 on the interior surface of a access-preventing cap 80*a* similar to the access-preventing cap 80 of the first embodiment 10 described above. The adapter 96 has a peripheral wall 104 that fully encloses the nut 12. The adapter 96 has a base 106 which has a hole to allow passage of the propeller shaft 98 therethrough. The access-preventing cap 80a of the second embodiment is generally of smaller dimensions than that of the first embodiment. As before, the cap 80*a* is in two sections 16*a* and 18*a*, and can only be removed from the adapter 96 by separating the two sections. As with the first embodiment, the two sections 16*a* and 18*a* are held together by a grooved dowel 20*a* passing through a hole 60*a* in the base portion of section 18*a* and a hole 32*a* in a tongue 28*a* extending from section 16*a*. A key operated locking flap 44*a* selectively engages or is disengaged from the groove 92*a* in the dowel 20*a* to allow the removal of the dowel 20*a* only by a possessor of the appropriate key 46*a*. The arrangement shown in FIG. 7 allows the cap 80*a* to turn freely relative to the adapter 96, thus turning the access-preventing cap 80*a* will not cause the adapter 96 or the nut 12 to be turned.

It is to be understood that the present invention is not limited to the embodiments described above, but encompasses any and all embodiments within the scope of the following claims.

I claim:

1. An anti-theft device for marine propellers, comprising:

a first section having a first base portion and a first wall portion;

a second section having a second base portion and a second wall portion, said first section and said second section fitting together to form an access-preventing cap having a base portion and a surrounding wall extending from said base portion, said surrounding wall having a rim portion distal from said base portion, said rim portion defining a front opening, said front opening having a first diameter, said base portion and said surrounding wall defining a first cavity sized to house a diffuser portion of a marine propeller hub, the diffuser portion being formed at least in part by an expanded portion being larger in diameter than said first diameter such that, when the diffuser portion of the marine propeller hub is housed within said first cavity, said access-preventing cap cannot be pulled off the marine propeller hub without first separating said first section from said second section, said first base portion having a tongue extending therefrom, said tongue having a first through hole, said second base portion having a second through hole extending from an exterior surface of said second base portion, said second through hole being in registry with said first through hole when said first section and said second section are fitted together to form said access-preventing cap;

a dowel, said dowel extending through said second through hole and said first through hole to prevent said first section from being separated from said second section, when said first section and said second section are fitted together to form said access-preventing cap and said dowel is positioned to extend through both said second through hole and said first through hole; and a key-operated lock incorporated in said first base portion, said key operated lock being selectively engageable with said dowel, said key-operated lock preventing said dowel from being removed from said second through hole and said first through hole when said key-operated lock engages said dowel, when said dowel is positioned to extend through both said second through hole and said first through hole, and when said first section and said second section are fitted together to form said access-preventing cap.

2. The anti-theft device for marine propellers according to claim 1, wherein said second base portion has a second cavity having an interior, said second cavity receiving said tongue when said first section and said second section are fitted together to form said access-preventing cap, said second through hole at least extending between said exterior surface of said second base portion and said interior of said second cavity.

3. The anti-theft device for marine propellers according to claim 1, wherein said dowel has a groove and said key-operated lock has a locking flap which is selectively engageable with said groove to secure said dowel in place within said first through hole and said second through hole.

4. The anti-theft device for marine propellers according to claim 1, further including a flexible tethering means connecting said dowel to one of said first section and said second section.

5. An anti-theft device for marine propellers, comprising:

an adapter having a peripheral wall and an adapter base, said adapter base having a through hole to allow passage of a propeller shaft therethrough, said peripheral wall having at least one flange extending radially therefrom;

a first section having a first base portion and a first wall portion;

a second section having a second base portion and a second wall portion, said first section and said second section fitting together to form an access-preventing cap having a base portion and a surrounding wall extending from said base portion, said surrounding wall having a rim portion distal from said base portion, said rim portion defining a front opening, said front opening having a first diameter, said base portion and said surrounding wall defining a cavity sized to house at least said flange, said flange being larger in diameter than said first diameter such that, when said flange is housed within said cavity, said access-preventing cap cannot be pulled away from said adapter without first separating said first section from said second section, said first base portion having a tongue extending therefrom, said tongue having a first through hole, said second base portion having a second through hole, said second through hole being in registry with said first through hole when said first section and said second section are fitted together to form said access-preventing cap;

a dowel, said dowel extending through said second through hole and said first through hole to prevent said first section from being separated from said second section, when said first section and said second section are fitted together to form said access-preventing cap and said dowel is positioned to extend through both said second through hole and said first through hole; and a key-operated lock incorporated in said first base portion, said key-operated lock being selectively engageable with said dowel, said key-operated lock preventing said dowel from being removed from said second through hole and said first through hole when said key-operated lock engages said dowel with said dowel positioned to extend through both said second through hole and said first through hole and with said first section and said second section fitted together to form said access-preventing cap, whereby when said adapter is mounted on the propeller shaft between a propeller hub and a propeller retaining nut, said key-operated lock is engaged to said dowel, said dowel is positioned to extend through both said second through hole and said first through hole, and said first section and said second section are fitted together to form said access-preventing cap, unauthorized access to the propeller retaining nut is prevented.

6. The anti-theft device for marine propellers according to claim 5, wherein said dowel has a groove and said key-operated lock has a locking flap which is selectively engageable with said groove to secure said dowel in place within said first through hole and said second through hole.

7. The anti-theft device for marine propellers according to claim 5, further including a flexible tethering means connecting said dowel to one of said first section and said second section.

* * * * *